(12) United States Patent
Oda

(10) Patent No.: US 8,877,404 B2
(45) Date of Patent: Nov. 4, 2014

(54) FUEL CELL AND METHOD OF MANUFACTURING A FUEL CELL

(75) Inventor: Tohru Oda, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 88 days.

(21) Appl. No.: 13/504,080

(22) PCT Filed: Jul. 5, 2011

(86) PCT No.: PCT/JP2011/003834
§ 371 (c)(1),
(2), (4) Date: Apr. 25, 2012

(87) PCT Pub. No.: WO2012/060029
PCT Pub. Date: May 10, 2012

(65) Prior Publication Data
US 2012/0270134 A1  Oct. 25, 2012

(30) Foreign Application Priority Data
Nov. 4, 2010 (JP) .................................. 2010-247491

(51) Int. Cl.
*H01M 8/10* (2006.01)
*H01M 4/88* (2006.01)
*H01M 4/86* (2006.01)
*H01M 8/02* (2006.01)

(52) U.S. Cl.
CPC .......... *H01M 8/1004* (2013.01); *H01M 8/0232* (2013.01); *H01M 4/881* (2013.01); *H01M 8/0234* (2013.01); *Y02E 60/521* (2013.01); *H01M 4/8657* (2013.01); *H01M 8/0245* (2013.01); *H01M 8/0297* (2013.01); *H01M 8/0239* (2013.01); *H01M 2008/1095* (2013.01)
USPC ............................ 429/480; 429/481; 429/529

(58) Field of Classification Search
USPC ........................................ 429/480, 481, 529
See application file for complete search history.

(56) References Cited

U.S. PATENT DOCUMENTS

| 2009/0246592 A1* | 10/2009 | Kinoshita ........................ 429/33 |
| 2010/0062309 A1 | 3/2010 | Akiyama et al. |
| 2010/0203425 A1 | 8/2010 | Mitsuoka et al. |
| 2010/0266927 A1 | 10/2010 | Suzuki |

FOREIGN PATENT DOCUMENTS

| DE | 112008000825 T5 | 1/2010 |
| DE | 102010001638 A1 | 8/2010 |
| DE | 112008003166 T5 | 10/2010 |
| JP | 2003-203646 A | 7/2003 |

(Continued)

OTHER PUBLICATIONS

International Search Report issued Sep. 6, 2011 in PCT/JP2011/003834.

*Primary Examiner* — Jane Rhee
(74) *Attorney, Agent, or Firm* — Kenyon & Kenyon LLP

(57) ABSTRACT

A fuel cell comprises an electrolyte membrane; first and second catalyst layers formed on respective faces of the electrolyte membrane; and first and second reinforcing layers holding therebetween the electrolyte membrane and the first and second catalyst layers, wherein the first catalyst layer and the first reinforcing layer are joined together with a force of not less than a specific joint strength that suppresses expansion and contraction of the electrolyte membrane, and the second catalyst layer and the second reinforcing layer are joined together with a force of less than a specific joint strength that releases a stress due to expansion and contraction of the electrolyte membrane, or the second catalyst layer and the second reinforcing layer are not joined together.

8 Claims, 8 Drawing Sheets

(56) References Cited

FOREIGN PATENT DOCUMENTS

| JP | 2006-331718 A | 12/2006 |
| JP | 2007-328935 A | 12/2007 |
| JP | 2008-516393 A | 5/2008 |
| JP | 2008-251290 A | 10/2008 |
| JP | 2008293856 A | 12/2008 |
| JP | 2009-032438 A | 2/2009 |
| JP | 2009-170244 A | 7/2009 |
| JP | 2009-238495 A | 10/2009 |
| JP | 2010-049933 A | 3/2010 |

\* cited by examiner

Fig.4

|  |  | RESIN VOLUME CONTENT IN SURFACE OF GAS DIFFUSION LAYER(%) | | | | |
| --- | --- | --- | --- | --- | --- | --- |
|  |  | 30 | 20 | 18 | 12 | 4 |
| RESIN VOLUME CONTENT IN SURFACE OF CATALYST LAYER (%) | 41 | ◎ | ◎ | ○ | × | × |
|  | 38 | ◎ | ◎ | ○ | × | × |
|  | 36 | ○ | ○ | □ | × | × |
|  | 35 | ○ | ○ | □ | × | × |
|  | 34 | × | × | × | × | × |
|  | 31 | × | × | × | × | × |
|  | 29 | × | × | × | × | × |
|  | 18 | × | × | × | × | × |

◎···15N/m<
○···10−15N/m
×···0−10N/m
□···INITIAL 0−10N/m→AFTER POWER GENERATION 10−15Nm $$dp = \frac{\lambda}{2\pi n_1}\left[sin^2\theta - \left(\frac{n_2}{n_1}\right)^2\right]^{-\frac{1}{2}}$$

$\lambda$ : WAVELENGTH OF RESIN ($\lambda = 8.30 \mu m$)

(WAVE NUMBER = $1206 cm^{-1}$)

$n_1$ : REFRACTIVE INDEX OF Ge ($n_1 = 4.00$)

$n_2$ : REFRACTIVE INDEX OF SAMPLE (RESIN) ($n_2 = 1.75$)

$\theta$ : INCIDENT ANGLE OF INFRARED LIGHT ($\theta = 60°$)

| STEP | CURRENT DENSITY | FLOW RATE | | GAS TEMP. | DEW POINT | | BACK PRESSURE | | COOLING WATER TEMP. (INLET) | TIME |
|---|---|---|---|---|---|---|---|---|---|---|
| | | $H_2$ | AIR | | $H_2$ | AIR | $H_2$ (Out) | AIR (Out) | | |
| | A/cm² | Ncc/min | Ncc/min | °C | °C | °C | MPa | MPa | °C | min |
| 1 | 0.2 | 500 | 2000 | 85 | 80 | 80 | 0.04 | 0.04 | 80 | 5 |
| 2 | 0.5 | 500 | 2000 | 85 | 80 | 80 | 0.04 | 0.04 | 80 | 5 |
| 3 | 1.0 | 500 | 2000 | 85 | 80 | 80 | 0.04 | 0.04 | 80 | 5 |
| 4 | 1.2 | 500 | 2000 | 85 | 80 | 80 | 0.04 | 0.04 | 80 | 5 |
| 5 | 1.5 | 500 | 2000 | 85 | 80 | 80 | 0.04 | 0.04 | 80 | 5 |

CROSS LEAK

|  |  | CATHODE | | | |
| --- | --- | --- | --- | --- | --- |
|  |  | ◎ | ○ | □ | × |
| ANODE | ◎ | OK | OK | OK | OK |
|  | ○ | OK | OK | OK | OK |
|  | □ | OK | OK | OK | OK |
|  | × | NG | NG | NG | NG |

REFERENCE VALUE: $100 nmol / (cm^2 \times sec \times atm)$

Fig.10

PERFORMANCE DEGRADATION RATE

| | | CATHODE | | | |
|---|---|---|---|---|---|
| | | ◎ | ○ | □ | × |
| ANODE | ◎ | −23% | −19% | −22% | −3% |
| | ○ | −34% | −14% | −21% | −2% |
| | □ | −23% | −16% | −32% | −6% |
| | × | −3% | −4% | −4% | −2% |

PERFORMANCE DEGRADATION RATE (%) $= \dfrac{V2-V1}{V1} \times 100$

FUEL CELL AND METHOD OF MANUFACTURING A FUEL CELL

This is a 371 national phase application of PCT/JP2011/003834 filed 5 Jul. 2011, which claims priority to Japanese Patent Application No. 2010-247491 filed 4 Nov. 2010, the contents of which are incorporated herein by reference.

TECHNICAL FIELD

The present invention relates to a fuel cell.

BACKGROUND ART

PTL1 describes a fuel cell, wherein catalyst layers formed on respective faces of an electrolyte membrane are not joined with gas diffusion layers, which are formed to be slightly larger in size than the catalyst layers, and part of the gas diffusion layers protruded out of the catalyst layers are bonded to part of the electrolyte membrane protruded out of the catalyst layers.

CITATION LIST

Patent Literature

[PTL1] JP2008-251290 A

SUMMARY OF INVENTION

Technical Problem

The prior art technique cannot, however, suppress expansion or contraction of the electrolyte membrane, so that fatigue may occur in the electrolyte membrane, which may result in performance degradation of the fuel cell.

The present invention is made in order to address at least part of the problem described above, and an object is to enhance the durability of the electrolyte membrane.

Solution to Problem

In order to achieve at least part of the foregoing, the present invention provides various aspects and embodiments described below.
[Aspect 1]
  A fuel cell, comprising:
  an electrolyte membrane;
  first and second catalyst layers formed on respective faces of the electrolyte membrane; and
  first and second reinforcing layers holding therebetween the electrolyte membrane and the first and second catalyst layers, wherein
  the first catalyst layer and the first reinforcing layer are joined together with a force of not less than a specific joint strength that suppresses expansion and contraction of the electrolyte membrane, and
  the second catalyst layer and the second reinforcing layer are joined together with a force of less than a specific joint strength that releases a stress due to expansion and contraction of the electrolyte membrane, or the second catalyst layer and the second reinforcing layer are not joined together.
  According to this aspect, the first catalyst layer and the first reinforcing layer are joined together with the force of not less than the specific joint strength that suppresses expansion and contraction of the electrolyte membrane. This advantageously reduces the degree of expansion and contraction of the electrolyte membrane and suppresses fatigue failure of the electrolyte membrane and the occurrence of folds, thus preventing the occurrence of cross leak. The second catalyst layer and the second reinforcing layer are joined together with the force of less than the specific joint strength that releases the stress due to expansion and contraction of the electrolyte membrane, or the second catalyst layer and the second reinforcing layer are not joined together. This structure releases the stress due to expansion and contraction of the electrolyte membrane, compared with the fuel cell of the structure having both a joint between the first catalyst layer and the first reinforcing layer and a joint between the second catalyst layer and the second reinforcing layer. This advantageously reduces the force applied to the catalyst layer and protects the catalyst layer from being damaged. This aspect enhances both the durability of the electrolyte membrane and the durability of the catalyst layer, thus preventing performance deterioration of the fuel cell.
[Aspect 2]
  The fuel cell according to aspect 1, wherein
  the first and second catalyst layers and the first and second reinforcing layers respectively contain resins,
  a resin volume content in a surface portion of the first catalyst layer opposed to the first reinforcing layer and a resin volume content in a surface portion of the first reinforcing layer opposed to the first catalyst layer are not less than preset values that join the first catalyst layer and the first reinforcing layer together with heat produced during power generation of the fuel cell or with hot press, and
  a resin volume content in a surface portion of the second catalyst layer opposed to the second reinforcing layer and a resin volume content in a surface portion of the second reinforcing layer opposed to the second catalyst layer are less than preset values that keep the second catalyst layer and the second reinforcing layer in a non-joined state even with the heat produced during power generation of the fuel cell or with hot press.
[Aspect 3]
  The fuel cell according to aspect 2, wherein
  before the first and second catalyst layers and the first and second reinforcing layers are joined together,
  the first catalyst layer and the first reinforcing layer meet both a condition that the resin volume content of the first catalyst layer is not less than 35% and a condition that the resin volume content of the first reinforcing layer is not less than 18%, and
  the second catalyst layer and the second reinforcing layer meet either a condition that the resin volume content of the second catalyst layer is less than 35% or a condition that the resin volume content of the second reinforcing layer is less than 18%.
  Meeting the conditions of the resin volume content in the first catalyst layer and the resin volume content in the first reinforcing layer enables the first catalyst layer and the first reinforcing layer to be joined together with the force of not less than the specific joint strength by applying the same hot press on the respective faces of the electrolyte membrane or during operation of the fuel cell. The second catalyst layer and the second reinforcing layer may be kept in the joined state with the force of less than the specific joint or in the non-joined state.
  The resin layers and the reinforcing layers contain the resins, so that the joint strength between the resin layer and the reinforcing layer is adjustable without any additional binding agent but by simply controlling the resin volume contents of the catalyst layer and the reinforcing layer.

[Aspect 4]

The fuel cell according to aspect 3, wherein
the resin volume content of the first catalyst layer is not less than 38%.

Further meeting this condition ensures a strong joint between the first catalyst layer and the first reinforcing layer.

[Aspect 5]

The fuel cell according to either one of claims 3 and 4, wherein
the resin volume content of the first reinforcing layer is not less than 20%.

Further meeting this condition ensures a strong joint between the first catalyst layer and the first reinforcing layer.

[Aspect 6]

The fuel cell according to any one of aspects 3 to 5, wherein
the resin volume contents of the first and second catalyst layers and the first and second reinforcing layers are measured by Fourier Transform Infrared Spectroscopy/Attenuated Total Reflectance technique.

The Fourier Transform Infrared Spectroscopy/Attenuated Total Reflectance technique can readily calculate the resin volume contents of the first and second catalyst layers and the first and second reinforcing layers.

[Aspect 7]

The fuel cell according to any one of aspects 1 to 6, wherein
the first catalyst layer is an anode catalyst layer, and
the second catalyst layer is a cathode catalyst layer.

It is preferable to join the layers on the anode side, while keeping the layers on the cathode side in the non-joined state, in order to prevent the occurrence of cross leak in the fuel cell and enhance the performance of the fuel cell. Joining the layers with the force of less than the specific joint strength (that releases the stress due to expansion and contraction of the electrolyte membrane) on the cathode side having the higher contribution to the power generation performance protects the catalyst layer from being damaged by expansion and contraction of the electrolyte membrane and prevents performance degradation of the fuel cell.

[Aspect 8]

The fuel cell according to any one of aspects 1 to 7, wherein
the reinforcing layer is a gas diffusion layer.

It is preferable that the gas diffusion layer also serves as the reinforcing layer.

[Aspect 9]

A method of manufacturing a fuel cell, comprising the steps of
(a) providing an electrolyte membrane;
(b) forming a first catalyst layer having a resin volume content of not less than 35% on a first face of the electrolyte membrane, while forming a second catalyst layer having a preset resin volume content on a second face of the electrolyte membrane;
(c) providing a first gas diffusion layer having a resin volume content of not less than 18% and a second gas diffusion layer having a preset resin volume content; and
(d) joining the first catalyst layer and the first gas diffusion layer together under hot press, while joining the second catalyst layer and the second gas diffusion layer together under hot press, wherein
in the steps (b) and (c), the second catalyst layer and the second gas diffusion layer meet at least one of two conditions that the resin volume content of the second catalyst layer is less than 35% and that the resin volume content of the second gas diffusion layer is less than 18%.

According to this aspect, the manufacturing method readily produces the fuel cell, wherein the first catalyst layer and the first reinforcing layer are joined together, while the second catalyst layer and the second reinforcing layer are not joined together.

The present invention may be implemented by diversity of aspects other than the fuel cell, for example, a method of manufacturing the fuel cell.

BRIEF DESCRIPTION OF DRAWINGS

FIG. 4 illustrates the relationship between the resin volume content in the surfaces of the catalyst layer and the gas diffusion layer and the joint strength of the catalyst layer and the gas diffusion layer.

FIG. 7 shows respective steps in power generation test of the fuel cell.

FIG. 10 shows the performance degradation rate of the fuel cell.

DESCRIPTION OF EMBODIMENT

Figure 1:
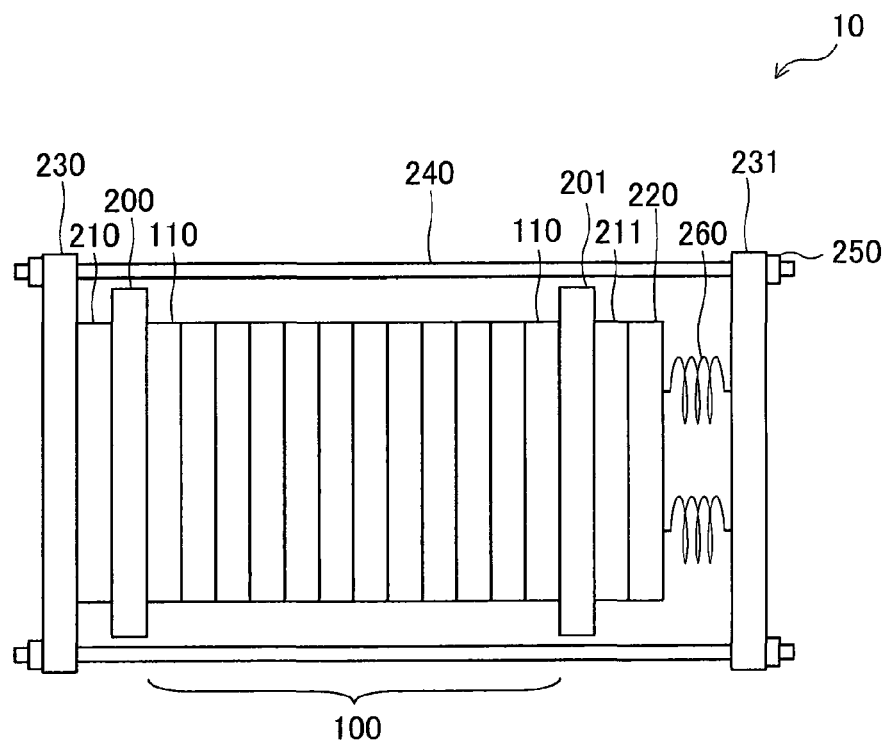
FIG. 1 illustrates the structure of a fuel cell according to one embodiment.

FIG. 1 illustrates the structure of a fuel cell according to one embodiment. The fuel cell 10 includes a series cell assembly 100, collector plates 200 and 201, insulating plates 210 and 211, a pressure plate 220, end plates 230 and 231, tension rods 240, nuts 250, and a pressure spring 260.

The series cell assembly 100 includes a plurality of power generation units 110. Each of the power generation units 110 is one unit cell. The power generation units 100 are stacked and connected in series to form the series cell assembly 100 and generate high voltage. The collector plates 200 and 201 are located on respective ends of the series cell assembly 100 to output the voltage and current generated by the series cell assembly 100. The insulating plates 210 and 211 are located outside the respective collector plates 200 and 201 to insulate the collector plates 200 and 201 from the other components, such as the end plates 230 and 231 and the tension rods 240. The end plate 230 and the pressure plate 220 are located further outside the insulating plates 210 and 211. The pressure spring 260 is located outside the pressure plate 220, and the end plate 231 is located further outside the pressure spring 260. The end plate 230 is disposed to keep a predetermined distance away from the end plate 230 by means of the tension rods 240 and the nuts 250. The pressure spring 260 presses the pressure plate 220 toward the insulating plate 211, in order to apply a certain clamping force to the power generation units 110.

Figure 2:
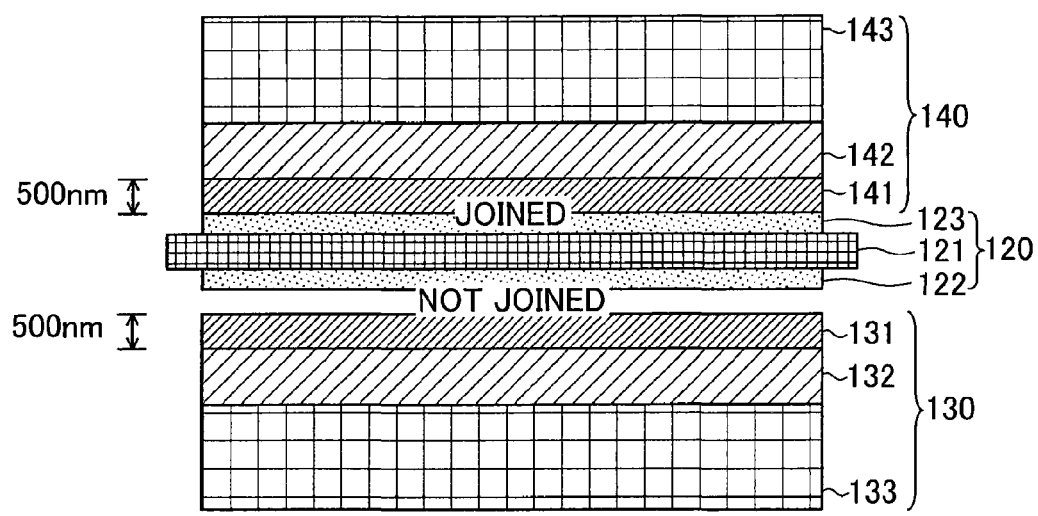
FIG. 2 is a close-up view showing the boundaries between a membrane electrode assembly and gas diffusion layers of one power generation unit.

FIG. 2 is a close-up view showing the boundaries between a membrane electrode assembly and gas diffusion layers of one power generation unit. The power generation unit 110 includes a membrane electrode assembly 120, a cathode-side gas diffusion layer 130 and an anode-side gas diffusion layer 140.

The membrane electrode assembly 120 includes an electrolyte membrane 121, a cathode catalyst layer 122 and an anode catalyst layer 123. The electrolyte membrane 121 is a proton-conductive ion exchange membrane made of a solid polymer material, for example, a fluororesin such as perfluorocarbon sulfonic acid polymer. The cathode catalyst layer 122 and the anode catalyst layer 123 contain a proton-conductive electrolyte and a catalyst accelerating the electrochemical reaction, for example, platinum catalyst or platinum alloy catalyst consisting of platinum and another metal. The platinum catalyst or the platinum alloy catalyst is supported on a conductive carrier, such as carbon. The cathode catalyst layer 122 is formed on one face of the electrolyte membrane 121, whilst the anode catalyst layer 123 is formed on the other face of the electrolyte membrane 121.

The cathode-side gas diffusion layer 130 is disposed to be in contact with the cathode catalyst layer 122. The cathode-side gas diffusion layer 130 is a member that allows passage and diffusion of an oxidizing gas to supply the oxidizing gas to the cathode catalyst layer 122. The cathode-side gas diffusion layer 130 includes a microporous layer (MPL) 131, a carbon base layer 132 and a porous metal layer 133, which are arranged in this order away from the cathode catalyst layer 122. The microporous layer 131 is made from the mixture of fine carbon particles and a fluororesin (polytetrafluoroethylene). The microporous layer 131 is applied on the carbon base layer 132 made of, for example, carbon cloth. The material of carbon cloth may be, for example, polyacrylonitrile, pitch or rayon. Carbon paper or unwoven fabric may be used, instead of carbon cloth. A porous metal material made from a metal, such as titanium, is used for the porous metal layer 133. Instead of porous metal material, expanded metal may be used for the porous metal layer 133. Similarly the anode-side gas diffusion layer 140 includes a microporous layer (MPL) 141, a carbon base layer 142 and a porous metal layer 143. The cathode catalyst layer 122 and the microporous layer 131 on the cathode side are not joined with each other, whilst the anode catalyst layer 123 and the microporous layer 141 on the anode side are joined with each other.

Figure 3:
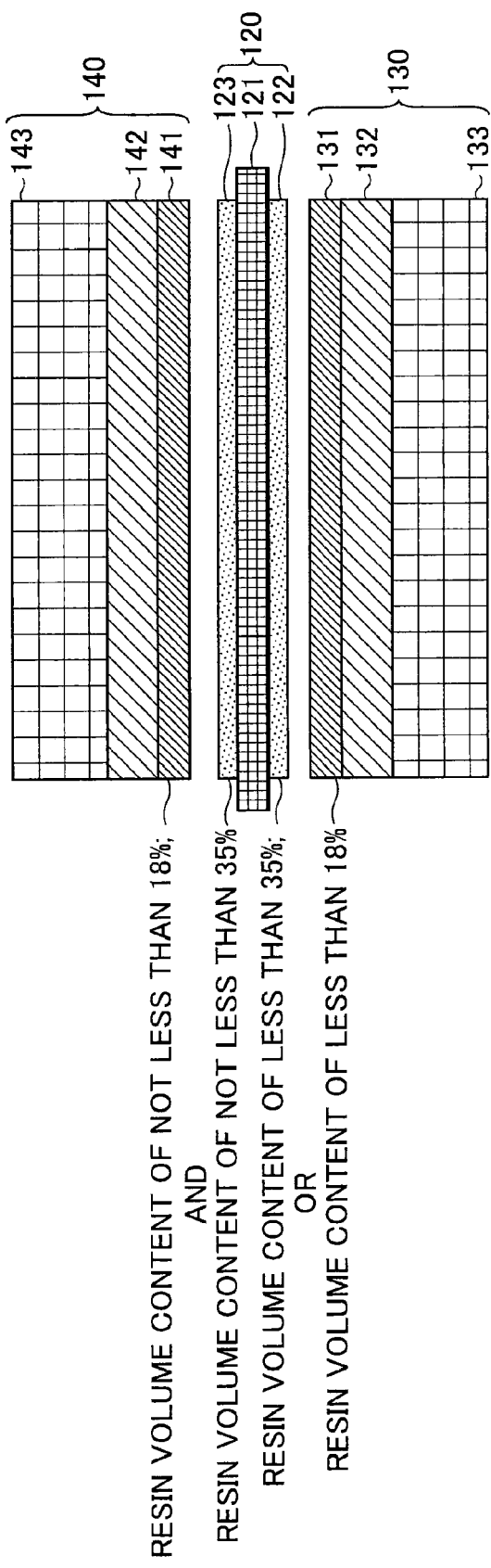
FIG. 3 illustrates the volume content of the resin or the resin volume content in the surfaces of the catalyst layers and the gas diffusion layers.

FIG. 3 illustrates the resin volume content in the surface portions of the catalyst layers and the gas diffusion layers. It is satisfactory if the cathode side layers are made to meet either the condition that the resin volume content of the cathode catalyst layer 122 is less than 35% or the condition that the resin volume content of the microporous layer 131 is less than 18%. On the other hand, it is satisfactory if the anode side layers are made to meet both the condition that the resin volume content of the anode catalyst layer 123 is not less than 35% and the condition that the resin volume content of the microporous layer 141 is not less than 18%. More specifically, the resin volume content of the anode catalyst layer 123 is preferably not less than 38%, and the resin volume content of the microporous layer 141 is preferably not less than 20%. The resin volume content satisfies the relational expression of "resin volume content+non-resin volume content+porosity=100%". The non-resin material means, for example, fine carbon particles in the microporous layers 131 and 141 and carbon as the carrier for supporting the catalyst in the cathode catalyst layer 122 and the anode catalyst layer 123. The grounds of the above numerical values will be described later.

FIG. 4 indicates the relationship between the resin volume content in the surface portions of the catalyst layer and the gas diffusion layer and the joint strength of the catalyst layer and the gas diffusion layer. The resin volume content in the surface portion of the microporous layer 131 is adjustable by controlling the ratio of the fluororesin to the fine carbon particles in the microporous layer 131 and the particle size of the carbon particles. For example, raising the ratio of the fluororesin to the fine carbon particles increases the resin volume content in the surface portion. The anode-side gas diffusion layer 130 is formed by applying the mixture of the fine carbon particles and the fluororesin(polytetrafluoroethylene) on the carbon base layer 132. At a fixed ratio of the fluororesin to the fine carbon particles, using the carbon particles of the large particle size facilitates sedimentation of the fluororesin toward the carbon base layer 132 (FIG. 2) during formation of the microporous layer 131 and thereby decreases the resin volume content in the surface portion. Using the carbon particles of the small particle size, on the other hand, interferes with easy sedimentation of the fluororesin toward the carbon base layer 132 (FIG. 2) during formation of the microporous layer 131 and thereby increases the resin volume content in the surface portion. The same discussion is applicable to the microporous layer 141 of the anode-side gas diffusion layer 140.

The cathode catalyst layer 122 contains the proton-conductive electrolyte and the conductive carrier with the supported catalyst as mentioned above. The resin volume content in the surface of the cathode catalyst layer 122 is adjustable by controlling the weight ratio of the proton-conductive electrolyte to the conductive carrier with the supported catalyst or by controlling the drying time during formation of the cathode catalyst layer 122. The resin in the catalyst layer denotes the proton-conductive electrolyte. Raising the ratio of the proton-conductive electrolyte to the conductive carrier increases the resin volume content in the surface portion. Rapid drying during formation of the cathode catalyst layer 122 causes the resin to be dried prior to sedimentation and thereby increases the resin volume content in the surface portion. Slow drying during formation of the cathode catalyst layer 122, on the other hand, decreases the resin volume content in the surface portion. The same discussion is applicable to the anode catalyst layer 123.

The foregoing describes only exemplary methods of adjusting the resin volume content in the surface portion. The resin volume content in the surface portion is adjustable by controlling various factors other than those described above, for example, the drying time during formation of the microporous layers 131 and 132, the particle size of the conductive carrier in the catalyst layers 122 and 123 or the length (molecular weight) of the fluororesin or the proton-conductive electrolyte.

Figure 5:
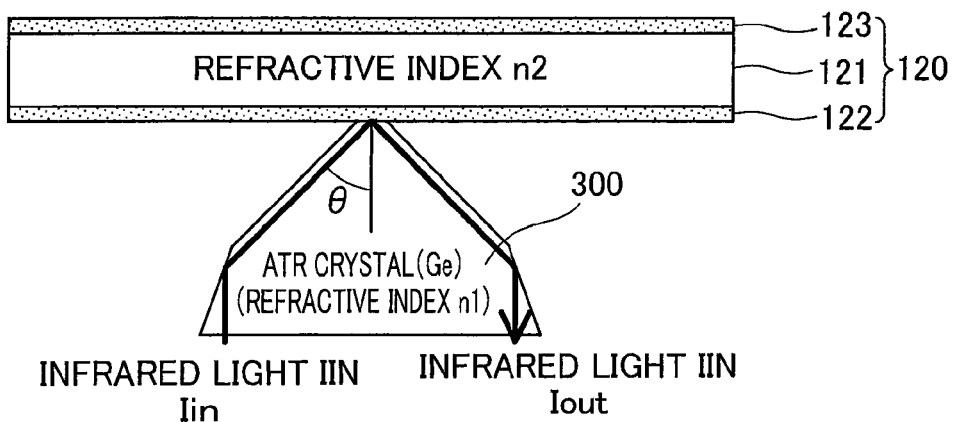
FIG. 5 illustrates a method of measuring the resin volume content.

FIG. 5 illustrates a method of measuring the resin volume content. According to this embodiment, the resin volume content is measured by the FT-IR/ATR technique. The FT-IR/ATR (Fourier Transform Infrared Spectroscopy/Attenuated Total Reflectance) technique brings germanium crystal (ATR crystal) into close contact with a catalyst layer as a sample to be measured (for example, cathode catalyst layer 122) and irradiates the germanium crystal with infrared light at an incident angle $\theta$ of greater than the critical angle. The infrared light is totally reflected from the interface between the ATR crystal and the cathode catalyst layer 122, while part of the infrared light as evanescent wave penetrates into the cathode catalyst layer 122 and is reflected from the cathode catalyst layer 122. The partial energy of the evanescent wave is absorbed and attenuated by the cathode catalyst layer 122. The structure of the cathode catalyst layer 122 is identifiable at the frequency at which such attenuation occurs, and the quantitative determination of the cathode catalyst layer 122 depends on the magnitude of the attenuation. According to this embodiment, when the wavelength of infrared light is 8.30 μm (wave number=1206 cm$^{-1}$) at which the C—F bond (carbon-fluorine bond)-derived peak appears, the refractive index n1 of the cathode catalyst layer 122 is 1.75 and the incident angle θ of infrared light is 60 degrees, the penetration depth dp of the evanescent wave is 440 nm. This means that the structure of the cathode catalyst layer 122 from the surface to the depth of 440 nm is identifiable.

Figure 6:
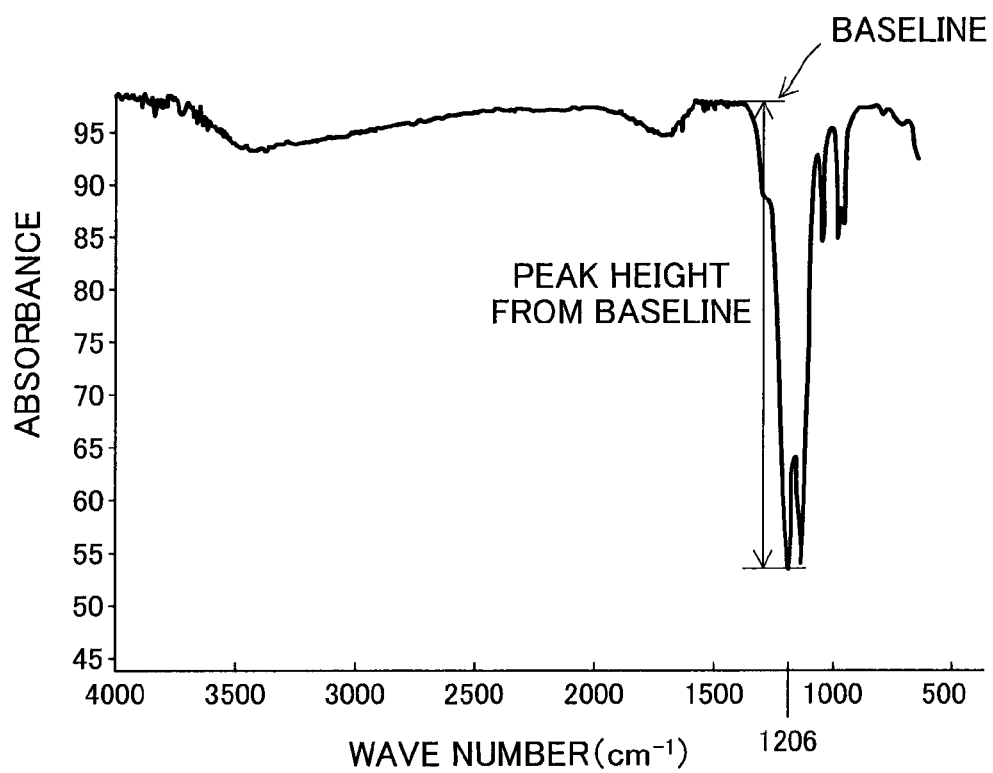
FIG. 6 shows one exemplary spectrum obtained by the FT-IR/ATR technique.

FIG. 6 shows one exemplary spectrum obtained by the FT-IR/ATR technique. The absorbance of infrared light at the wave number=1206 cm$^{-1}$ (wavelength=8.30 μm) is proportional to the number of C—F bonds in the sample. The measurement procedure first measures the FT-IR spectrum of a standard material entirely made of fluororesin (resin volume content in the surface portion=100%) and obtains a peak height h1 from the baseline at the wave number=1206 cm$^{-1}$ (8.30 μm). The measurement procedure similarly obtains a peak height h2 of the sample from the baseline at 8.30 μm and then calculates the resin volume content in the surface portion of the sample by normalization of h1/h2.

The membrane electrode assemblies 120 and the gas diffusion layers 130 and 140 were made to have various resin volume contents in the surface portions, and their resin volume contents in the respective surface portions were measured. Then the membrane electrode assembly 120 and the gas diffusion layers 130 and 140 were kept in hot press of 1.2 MPa at a temperature of 100° C. for four minutes, and examined the relationship between the surface resin volume content and the joint state. The results are shown in FIG. 4. When the gas diffusion layers 130 and 140 had the surface resin volume content of not less than 20% and the catalyst layers 122 and 123 had the surface resin volume content of not less than 38%, the joint strength was not less than 15 N/m. When the gas diffusion layers 130 and 140 had the surface resin volume content of not less than 20% and the catalyst layers 122 and 123 had the surface resin volume content of not less than 35%, the joint strength was not less than 10 N/m. When the catalyst layers 122 and 123 had the surface resin volume content of not less than 38% and the gas diffusion layers 130 and 140 had the surface resin volume content of not less than 18%, the joint strength was not less than 10 N/m. When the gas diffusion layers 130 and 140 had the surface resin volume content of 18% and the catalyst layers 122 and 123 had the surface resin volume content of 35% or 36%, the layers were not joined together by simply keeping them in hot press of 1.2 MPa at a temperature of 100° C. for four minutes. However, when the joint strength was measured again after the fuel cell was subjected to power generation test of FIG. 7, the layers were joined together with the joint strength of not less than 10 N/m. The method of measuring the joint strength will be described later.

FIG. 7 shows respective steps in power generation test of the fuel cell. The fuel cell 10 (FIG. 1) was clamped with the clamping pressure of 2 MPa. The fuel cell was subjected to the power generation test under the conditions that the flow rate of hydrogen gas as one reactive gas was 500 Ncc/min, the flow rate of the air as the other reactive gas was 2000 Ncc/min, the temperature of reactive gas was 85° C., the dew point of reactive gas was 80° C., the back pressure of hydrogen was 0.04 MPa, the back pressure of the air was 0.04 MPa, and the temperature of cooling water was 80° C. The current density of the electric current from the fuel cell was gradually increased at five minute intervals from 0.2 A/cm$^2$ through 0.5, 1.0, 1.2 to 1.5 A/cm$^2$. During the experiment, the fuel cell 10 was kept in temperature of not lower than 80° C. The clamping pressure of 2 MPa and the temperature of not lower than 80° C. were close to the condition of hot press (1.2 MPa and 100° C.) for joining the membrane electrode assembly 120 with the gas diffusion layers 130 and 140. There is thus expectation of joining these layers together during the power generation test of the fuel cell 100.

As shown in FIG. 4, when the gas diffusion layers 130 and 140 had the surface resin volume content of less than 18% or the catalyst layers 122 and 123 had the surface resin volume content of less than 35%, there were no joints made between the catalyst layers 122 and 123 and the gas diffusion layers 130 and 140 under the condition of hot press (1.2 MPa and 100° C.) or under the condition of power generation (2 MPa and not lower than 80° C.). When the gas diffusion layers 130 and 140 had the surface resin volume content of not less than 18% and the catalyst layers 122 and 123 had the surface resin volume content of not less than 35%, on the other hand, there were joints made between the catalyst layers 122 and 123 and the gas diffusion layers 130 and 140 under the condition of hot press (1.2 MPa and 100° C.) or under the condition of power generation (2 MPa and not lower than 80° C.). When the gas diffusion layers 130 and 140 had the surface resin volume content of not less than 20% and the catalyst layers 122 and 123 had the surface resin volume content of not less than 35%, there were joints with the gas diffusion layers 130 and 140 under the condition of hot press (1.2 MPa and 100° C.). When the gas diffusion layers 130 and 140 had the surface resin volume content of not less than 18% and the catalyst layers 122 and 123 had the surface resin volume content of not less than 38%, there were joints with the gas diffusion layers 130 and 140 under the condition of hot press (1.2 MPa and 100° C.). When the gas diffusion layers 130 and 140 had the surface resin volume content of not less than 20% and the catalyst layers 122 and 123 had the surface resin volume content of not less than 38%, there were strong joints (15 N/m) with the gas diffusion layers 130 and 140 under the condition of hot press (1.2 MPa and 100° C.).

Figures 8, 9:
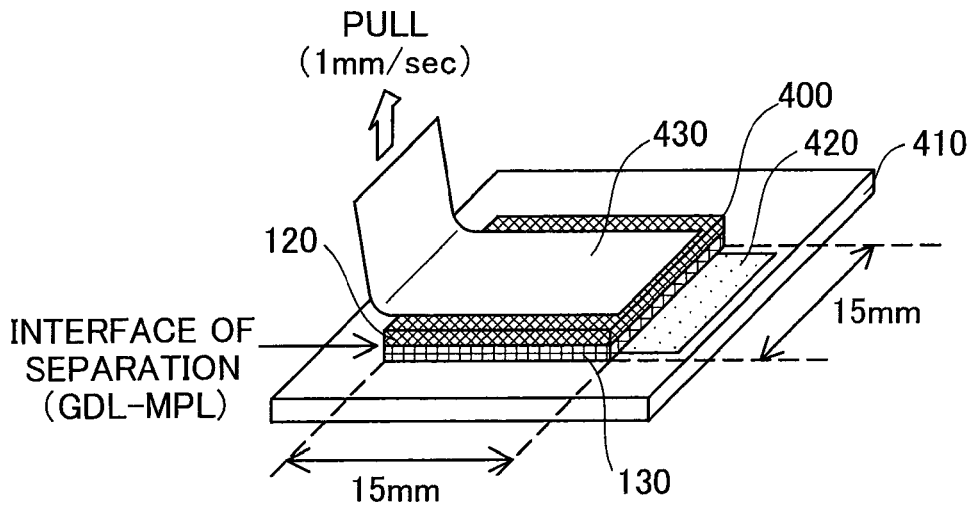
FIG. 8 illustrates a method of measuring the joint strength of the catalyst layer with the gas diffusion layer.
FIG. 9 shows the test results of cross leak in the electrolyte membrane.

FIG. 8 illustrates a method of measuring the joint strength of the catalyst layer with the gas diffusion layer. The method first cuts each sample 400 of the membrane electrode assembly 120 joined with the cathode-side gas diffusion layer 130 to the size of 15 mm×15 mm in square. In this state, it is preferable that the anode catalyst layer 123 is eliminated in advance from the membrane electrode assembly 120 or that the anode catalyst layer 123 is not formed but only the cathode catalyst layer 122 is formed on the electrolyte membrane 121.

The method subsequently bonded and fixed the gas diffusion layer 130 of the sample 400 to a substrate 410 with a double-sided adhesive tape 420, and applied a tape 430 on the membrane electrode assembly 120 of the sample 400. The method then pulled the tape 430 at the rate of 1 mm/sec with Autograph (registered trademark) manufactured by Shimadzu Corporation and measured the stress-displacement curve. The joint strength of the membrane electrode assembly 120 with the cathode-side gas diffusion layer 130 was measured from the obtained stress-displacement curve.

FIG. 9 shows the test results of cross leak in the electrolyte membrane. The temperature cycle test was performed for the joint body of the membrane electrode assembly 120 with the cathode-side gas diffusion layer 130 and the anode-side gas diffusion layer. The temperature cycle test kept the joint body at −20° C. for 60 minutes and at 70° C. for 30 minutes and repeated this cycle 800 times. The joint body was then examined for the presence of cross leak, wherein the reference value of hydrogen gas cross leak as the judgment criterion was set to 100 nmol/(cm$^2$×sec×atm). On the anode side, when the anode-side gas diffusion layer 140 and the anode catalyst layer 123 were joined together (indicated by double-circle, circle or square in the drawing), no cross leak occurs, irrespective of the joint state of the cathode-side gas diffusion layer 130 with the cathode catalyst layer 122.

FIG. 10 shows the performance degradation rate of the fuel cell. The performance degradation rate of the fuel cell was calculated by $(V2-V1)/V1\times100(\%)$, wherein V1 and V2 respectively denote OCV before the temperature cycle test and OCV after the temperature cycle test. In the state that there are joints both between the cathode-side gas diffusion layer 130 and the cathode catalyst layer 122 and between the anode-side gas diffusion layer 140 and the anode catalyst layer 123, the performance degradation rate by the temperature cycle test was not lower than 14%. In the state that there is no joint at least either between the cathode-side gas diffusion layer 130 and the cathode catalyst layer 122 or between the anode-side gas diffusion layer 140 and the anode catalyst layer 123, on the other hand, the performance degradation rate by the temperature cycle test was not higher than 6%.

According to the results of FIGS. 9 and 10, in the state that the cathode-side gas diffusion layer 130 is not joined with the cathode catalyst layer 122 but the anode-side gas diffusion layer 140 is joined with the anode catalyst layer 123, the temperature cycle test causes no significant cross leak and no significant performance degradation. This joint state enhances the durability of the membrane electrode assembly 120 or the fuel cell 10, compared with the state that there are joints both between the cathode-side gas diffusion layer 130 and the cathode catalyst layer 122 and between the anode-side gas diffusion layer 140 and the anode catalyst layer 123 or with the state that there are no joints.

According to the embodiment described above, the membrane electrode assembly 120 includes the electrolyte membrane 121 and the cathode catalyst layer 122 and the anode catalyst layer 123 formed on the respective faces of the electrolyte membrane 121. The cathode-side gas diffusion layer 130 and the anode-side gas diffusion layer 140 are placed across the membrane electrode assembly 120. The anode catalyst layer 123 is joined with the anode-side gas diffusion layer 140, whilst the cathode catalyst layer 122 is not joined with the cathode-side gas diffusion layer 130. This joint state enhances the durability of the membrane electrode assembly 120 or the fuel cell 10, compared with the state that there are joints both between the cathode-side gas diffusion layer 130 and the cathode catalyst layer 122 and between the anode-side gas diffusion layer 140 and the anode catalyst layer 123 or with the state that there are no joints.

The embodiment uses the gas diffusion layers 130 and 140 for the purpose of reinforcing the membrane electrode assembly 120. Reinforcing layers may thus be used, instead of the gas diffusion layers 130 and 140.

On the anode side, it is preferable to meet both the condition that the resin volume content of the anode catalyst layer 123 is not less than 35% and the condition that the resin volume content of the anode-side gas diffusion layer 140 is not less than 18%. On the cathode side, it is preferable to meet either the condition that the resin volume content of the cathode catalyst layer 122 is less than 35% or the condition that the resin volume content of the cathode-side gas diffusion layer 130 is less than 18%. More preferably, the resin volume content of the anode catalyst layer 123 is not less than 38%, or the resin volume content of the anode-side gas diffusion layer 140 is not less than 20%.

In this embodiment, the relation of $X=Y=10$ is used where $X$ [N/m] denotes a force of not less than a specific joint strength that suppresses expansion and contraction of the electrolyte membrane 121 and $Y$ [N/m] denotes a force of less than a specific joint strength that releases a stress due to expansion and contraction of the electrolyte membrane 121. The values of X and Y may be other than 10 depending on the electrolyte membrane 121. When $X \geq Y$ holds, X and Y may be different values.

The foregoing has described the invention in detail with reference to the illustrative embodiment and examples. The embodiment of the invention described above is only illustrative for the purpose of better understanding of the invention, and the invention is not limited to this embodiment in any sense. Various variants and modifications may be made to the embodiment without departing from the spirit and the scope of the invention. The invention includes such variants, modifications and equivalents.

DESCRIPTION OF MARK 10 fuel cell
100 series cell assembly
110 power generation unit
120 membrane electrode assembly
121 electrolyte membrane
122 cathode catalyst layer
123 anode catalyst layer
130 cathode-side gas diffusion layer
131 microporous layer
132 carbon base layer
133 porous metal layer
140 anode-side gas diffusion layer
141 microporous layer
142 carbon base layer
143 porous metal layer
200 collector plates
210 insulating plates
220 pressure plate
230 end plate
231 end plate
240 tension rod
250 nut
260 pressure spring
400 sample
410 substrate
420 double-sided adhesive tape
430 tape

The invention claimed is:

1. A fuel cell, comprising:
an electrolyte membrane;
first and second catalyst layers formed on respective faces of the electrolyte membrane; and
first and second reinforcing layers holding therebetween the electrolyte membrane and the first and second catalyst layers, a joint strength between the first catalyst layer and the first reinforcing layer being not less than a specific joint strength that suppresses expansion and contraction of the electrolyte membrane, a joint strength between the second catalyst layer and the second reinforcing layer being less than a specific joint strength that releases a stress due to expansion and contraction of the electrolyte membrane or zero, wherein before the first and second catalyst layers and the first and second reinforcing layers are joined together, the first catalyst layer and the first reinforcing layer meet both a condition that the resin volume content of the first catalyst layer is not less than 35% and a condition that the resin volume content of the first reinforcing layer is not less than 18%, and the second catalyst layer and the second reinforcing layer meet either a condition that the resin volume content of the second catalyst layer is less than 35% or a condition that the resin volume content of the second reinforcing layer is less than 18%.

2. The fuel cell according to claim 1, wherein:

the first and second catalyst layers and the first and second reinforcing layers respectively contain resins, a resin volume content in a surface portion of the first catalyst layer opposed to the first reinforcing layer and a resin volume content in a surface portion of the first reinforcing layer opposed to the first catalyst layer are not less than preset values that join the first catalyst layer and the first reinforcing layer together with heat produced during power generation of the fuel cell or with hot press, and a resin volume content in a surface portion of the second catalyst layer opposed to the second reinforcing layer and a resin volume content in a surface portion of the second reinforcing layer opposed to the second catalyst layer are less than preset values that keep the second catalyst layer and the second reinforcing layer in a non-joined state even with the heat produced during power generation of the fuel cell or with hot press.

3. The fuel cell according to claim 1, wherein the resin volume content of the first catalyst layer is not less than 38%.

4. The fuel cell according to claim 1, wherein the resin volume content of the first reinforcing layer is not less than 20%.

5. The fuel cell according to claim 1, wherein the resin volume contents of the first and second catalyst layers and the first and second reinforcing layers are measured by Fourier Transform Infrared Spectroscopy/Attenuated Total Reflectance technique.

6. The fuel cell according to claim 1, wherein the first catalyst layer is an anode catalyst layer, and the second catalyst layer is a cathode catalyst layer.

7. The fuel cell according to claim 1, wherein the reinforcing layer is a gas diffusion layer.

8. A method of manufacturing a fuel cell, the method comprising:

(a) providing an electrolyte membrane;

(b) forming a first catalyst layer having a resin volume content of not less than 35% on a first face of the electrolyte membrane, while forming a second catalyst layer having a preset resin volume content on a second face of the electrolyte membrane;

(c) providing a first gas diffusion layer having a resin volume content of not less than 18% and a second gas diffusion layer having a preset resin volume content; and (d) keeping the first catalyst layer and the first gas diffusion layer together under hot press, and keeping the second catalyst layer and the second gas diffusion layer together under hot press, wherein in (b) and (c), the second catalyst layer and the second gas diffusion layer meet at least one of two conditions that the resin volume content of the second catalyst layer is less than 35% and that the resin volume content of the second gas diffusion layer is less than 18%.

* * * * *